US012192598B2

(12) United States Patent
 Zhang

(10) Patent No.: US 12,192,598 B2
(45) Date of Patent: Jan. 7, 2025

(54) METHOD OF PROCESSING AUDIO OR VIDEO DATA, DEVICE, AND STORAGE MEDIUM

(71) Applicant: Beijing Baidu Netcom Science Technology Co., Ltd., Beijing (CN)

(72) Inventor: Mingyue Zhang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 297 days.

(21) Appl. No.: 17/646,122

(22) Filed: Dec. 27, 2021

(65) Prior Publication Data
 US 2022/0124420 A1    Apr. 21, 2022

(30) Foreign Application Priority Data

Feb. 19, 2021    (CN) .......................... 202110188970.9

(51) Int. Cl.
 *H04N 21/8547*    (2011.01)
 *G06F 40/137*    (2020.01)
 *G06F 40/40*    (2020.01)

(52) U.S. Cl.
 CPC ....... *H04N 21/8547* (2013.01); *G06F 40/137* (2020.01); *G06F 40/40* (2020.01)

(58) Field of Classification Search
 CPC ....... H04N 21/8547; H04N 21/440236; H04N 21/8549; G06F 40/137; G06F 40/40;
 (Continued)

(56) References Cited

U.S. PATENT DOCUMENTS 6,279,014 B1 *    8/2001    Schilit .................. G06F 40/117
                                                              715/244
9,971,572 B2 *    5/2018    Childs ...................... G06F 8/33
(Continued)

FOREIGN PATENT DOCUMENTS

CN    101382937    3/2009
CN    101833584    9/2010
(Continued)

OTHER PUBLICATIONS

Chinese Office Action, issued in the corresponding Chinese Patent Application No. 202110188970.9, dated May 20, 2023, 8 pages.
(Continued)

*Primary Examiner* — Helen Shibru
(74) *Attorney, Agent, or Firm* — HSML P.C.

(57) ABSTRACT

A method of processing audio or video data is provided, which relates to a field of a natural language processing technology, and in particular to a semantic understanding of a natural language. The method includes: extracting a text information from the audio or video data; generating a text outline and a plurality of time periods according to the text information, the text outline includes multi-level outline entries, and the plurality of time periods are associated with the multi-level outline entries; generating a display field for the audio or video data according to the text outline and the plurality of time periods; adding the display field to the audio or video data, so as to obtain updated audio or video data. A device, and a storage medium are further provided.

20 Claims, 9 Drawing Sheets

(58) Field of Classification Search
CPC ...... G06F 16/313; G06F 16/345; G06F 16/41;
G06F 16/483; G06F 16/61; G06F 16/685;
G06F 16/71; G06F 16/7844; G06F
40/258; G06F 16/686; G06F 16/7867;
G06F 16/908; G06F 16/683; G06F
16/901; G06F 16/904; G06N 3/08
USPC ........................................................ 386/241
See application file for complete search history.

(56) References Cited

U.S. PATENT DOCUMENTS

| | | | | |
|---|---|---|---|---|
| 10,185,707 | B2* | 1/2019 | Fay | G06F 40/12 |
| 10,880,614 | B2* | 12/2020 | Favicchio | H04N 21/466 |
| 11,295,497 | B2* | 4/2022 | Castellucci | G06T 7/33 |
| 2011/0078018 | A1* | 3/2011 | Chunilal | G06F 16/2428 |
| | | | | 705/14.66 |
| 2012/0179465 | A1 | 7/2012 | Cox et al. | |
| 2017/0169853 | A1 | 6/2017 | Hu et al. | |
| 2018/0359530 | A1 | 12/2018 | Marlow et al. | |
| 2020/0372481 | A1* | 11/2020 | Olsen, Jr. | G06Q 50/205 |
| 2024/0273793 | A1* | 8/2024 | DeCharms | G06F 3/0488 |

FOREIGN PATENT DOCUMENTS

| | | |
|---|---|---|
| CN | 111988663 | 11/2020 |
| CN | 112231498 | 1/2021 |
| CN | 112232066 | 1/2021 |
| JP | 2020-005309 | 1/2020 |
| TW | 201218755 | 5/2012 |

OTHER PUBLICATIONS

Japanese Office Action, issued in the corresponding Japanese Patent Application No. 2021-154587, dated Dec. 16, 2022, 4 pages.
Office Action, issued in corresponding Korean patent application No. 10-2021-0126011, dated Jun. 18, 2024, 18 pages.

* cited by examiner

METHOD OF PROCESSING AUDIO OR VIDEO DATA, DEVICE, AND STORAGE MEDIUM

CROSS-REFERENCE TO RELATED APPLICATION

This application claims the benefit of Chinese Patent Application No. 202110188970.9 filed on Feb. 19, 2021, the whole disclosure of which is incorporated herein by reference.

TECHNICAL FIELD

The present disclosure relates to a field of a natural language processing technology, specifically to a semantic understanding of a natural language, and in particular to a method of processing audio or video data, a device, and a storage medium.

BACKGROUND

At present, acquiring information by consuming audio or video data is a main way of knowledge dissemination. When a user listens to an audio or watches a video, if the audio or the video has a relatively short duration, it tends to quickly locate a desired content of the audio or the video. However, if the audio or the video has a relatively long duration, the desired content of the audio or the video may not be located quickly and accurately in a limited time, which may cause a bad experience to the user. Especially as the duration of audio or video increases, or in a case that the audio or the video contains a large amount of content that the user is not interested in, user's attention and interest may decrease, so that an intention of continuing consumption may be interrupted.

SUMMARY

The present disclosure provides a method of processing audio or video data, a device, and a storage medium.

According to an aspect of the present disclosure, there is provided a method of processing audio or video data, including:

extracting a text information from the audio or video data;

generating a text outline and a plurality of time periods according to the text information, wherein the text outline includes multi-level outline entries, and the plurality of time periods are associated with the multi-level outline entries;

generating a display field for the audio or video data according to the text outline and the plurality of time periods; and adding the display field to the audio or video data, so as to obtain updated audio or video data.

According to another aspect of the present disclosure, there is provided a method of processing audio or video data, including:

acquiring updated audio or video data, wherein the updated audio or video data is generated according to the method described above; and extracting a display field from the updated audio or video data, and creating a display control according to the display field.

According to another aspect of the present disclosure, there is provided an electronic device, including:

at least one processor; and a memory communicatively connected to the at least one processor, wherein the memory stores instructions executable by the at least one processor, and the instructions, when executed by the at least one processor, cause the at least one processor to implement the method described above.

According to another aspect of the present disclosure, there is provided a non-transitory computer-readable storage medium having computer instructions stored thereon, wherein the computer instructions allow a computer to implement the method described above.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The drawings are used to understand the solution better and do not constitute a limitation to the present disclosure.

DETAILED DESCRIPTION OF EMBODIMENTS

Exemplary embodiments of the present disclosure are described below with reference to the drawings, which include various details of the embodiments of the present disclosure to facilitate understanding, and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

Existing audio or video service does not provide a content overview function. In order to quickly locate a desired content, a user needs to search for the desired content by dragging a progress bar of a player on an interface of a client. This method may not achieve accurate positioning and may miss important content. In a case of browsing audio or video data that is not downloaded to the client, a buffering time may be too long and a search may be unavailable. In some video websites, in order to facilitate the user to browse a video content, a method is adopted to segment a long video into a plurality of short videos. This method requires detailed planning of a video segmentation, and includes complex and time-consuming steps of making segmented videos, so that a production cost is increased. In addition, the above two methods are not applicable to a playback of a live streaming video. The live streaming video is generally very long (for example, up to several hours), and the live streaming video is usually stored on a specific platform and does not need to be downloaded during playback. The embodiments of the present disclosure provide a method of processing audio or video data, in which a text outline is created by extracting a text information of the audio or video data, so that a lengthy video may be previewed and located rapidly through the text outline.

Figure 1:
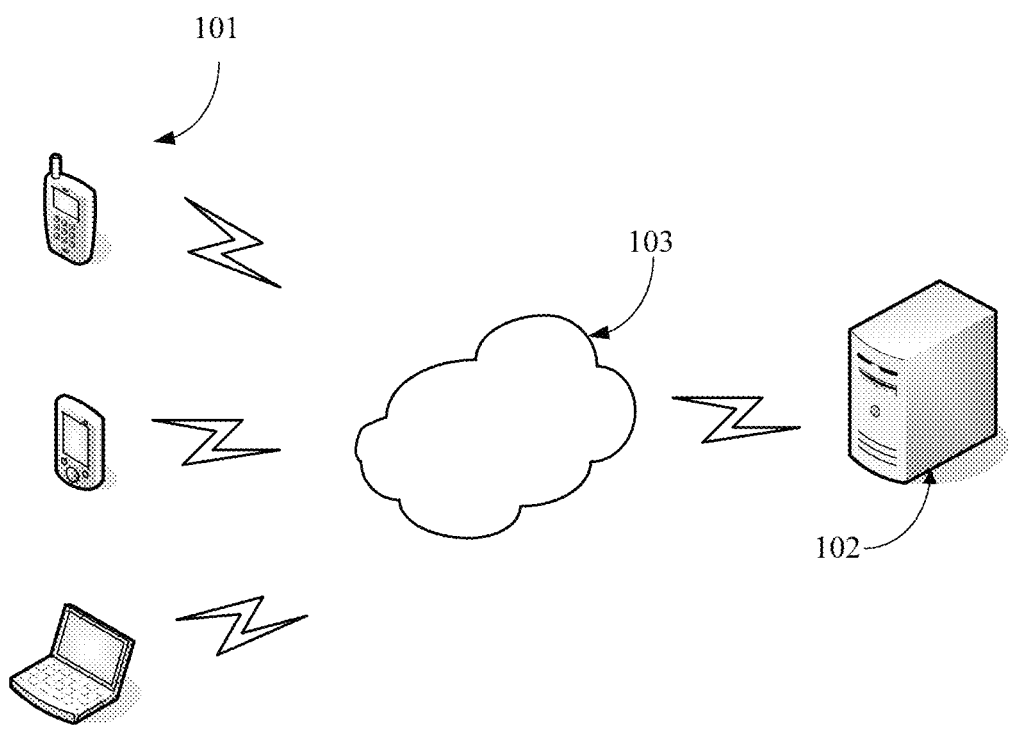
FIG. 1 shows a schematic diagram of an application scenario involved in the embodiments of the present disclosure.

FIG. 1 shows a schematic diagram of an application scenario involved in the embodiments of the present disclosure. A plurality of terminal devices 101, a server 102 and a network 103 are shown in FIG. 1. The network 103 is a medium used to provide a communication link between the terminal devices 101 and the server 102. The network 103 may include various connection types, such as wired and/or wireless communication links, and so on. The terminal device 101 may be various electronic devices that support a video or audio playback. A client of an audio or video playback application may be installed on the terminal device 101. The user may request audio or video data from the server 102 through the client and play it on the terminal device 101. Examples of the terminal device 101 include, but are not limited to, a personal computer, a notebook computer, a tablet computer, a mobile phone, a smart phone, a personal digital assistant PDA, a wearable device, and the like. The server 102 is a computing device that may provide an audio or video data service. For example, the server 102 may be a host of a video website or a live streaming platform. A large amount of audio or video data desired by the user or streaming data after a live streaming may be stored on the server 102. The user may connect to the server 102 through the terminal device 101, and may watch a video online and download a video, for example, through a video website. Alternatively, the user may connect to the server 102 through the terminal device 101, and may open a live streaming to others, for example, through a live streaming platform. The server 102 may be an independent server or a cluster including a plurality of servers. A system architecture shown in FIG. 1 is only an example. The method of processing audio or video data according to the embodiments of the present disclosure may be applied to any suitable scene to process the audio or video data.

Figure 2:
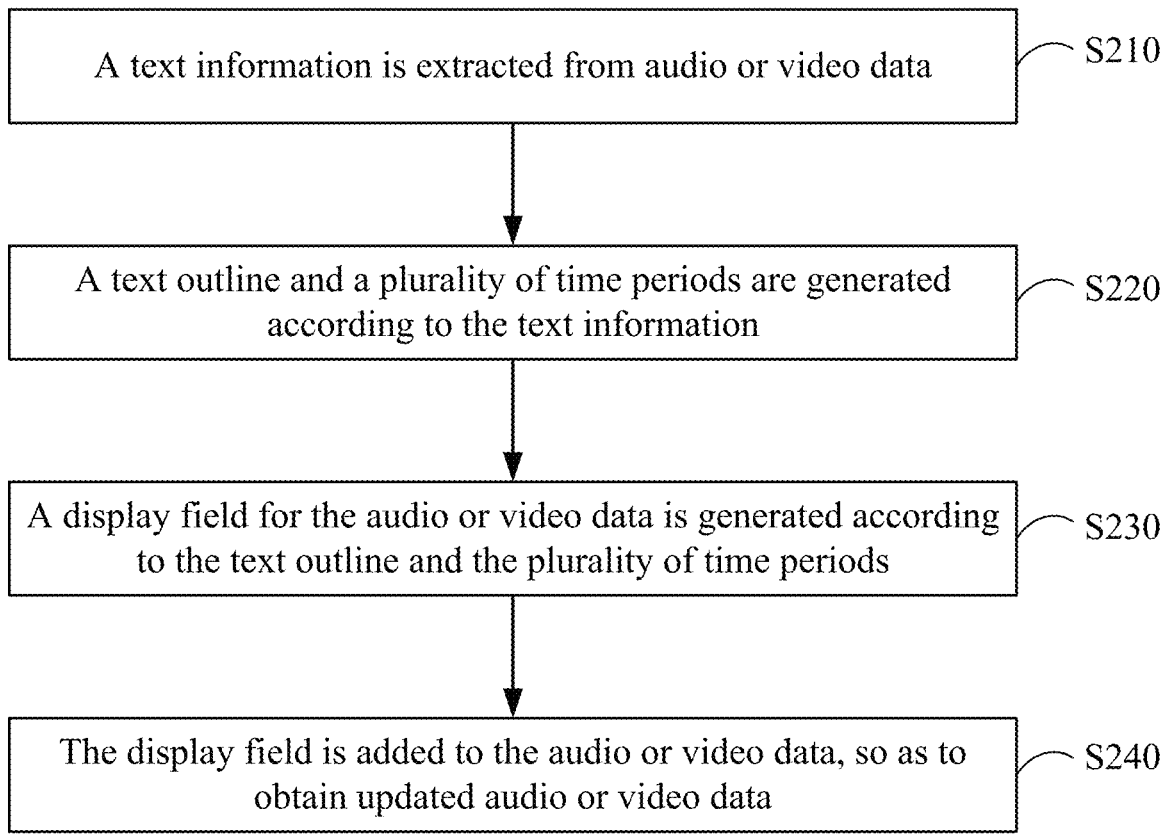
FIG. 2 shows a flowchart of a method of processing audio or video data according to some embodiments of the present disclosure.

FIG. 2 shows a flowchart of a method 200 of processing audio or video data according to some embodiments of the present disclosure. The method 200 of processing audio or video data may be applied to a server providing an audio or video data service, and used to process the audio or video data. As shown in FIG. 2, the method 200 of processing the audio or video data includes following steps.

In step S210, a text information is extracted from the audio or video data.

In step S220, a text outline and a plurality of time periods are generated according to the text information.

In step S230, a display field for the audio or video data is generated according to the text outline and the plurality of time periods.

In step S240, the display field is added to the audio or video data, so as to obtain updated audio or video data.

According to the embodiments, if the data to be processed is audio data, the text information may be extracted directly from the audio data. For example, the audio data to be processed may be input into a speech recognition module with a speech recognition function, and the speech recognition module may recognize the input audio data as an original text information. According to the embodiments, if the data to be processed is video data, original PCM (Pulse Code Modulation) data of an audio portion may be extracted from the video data, and the original PCM data may be input into the speech recognition module for recognition, so as to obtain an original text information. The speech recognition module in the above example may be constructed based on any suitable related art, which is not limited by the embodiments of the present disclosure.

According to the embodiments, the text outline may include multi-level outline entries, which may be associated with the plurality of time periods. The text information generally has an internal logical structure. The logical structure is exhibited as using a text information content to describe the same or similar topics. In the embodiments of the present disclosure, each level of outline entry in the text outline may be used to represent such same or similar topics. With the text outline, it is possible to quickly preview a text, and obtain a summary of the text information and a distribution of the text information content. Since the text information is extracted from the audio or video data, a text statement in the text information may correspond to a time period of the audio or video. Therefore, an overview of the audio or video content may be achieved by means of the text outline.

According to the embodiments, an association relationship between the text outline and the time period and an association relationship between the plurality of outline entries in the text outline and the plurality of time periods may be stored using the display field. In a specific embodiment, each level of outline entry in the text outline and an associated time period in the plurality of time periods may be combined into a data pair, and the data pair may be stored in a special data structure as the display field according to a hierarchical relationship between the multi-level outline entries. According to the embodiments, the data pair may be stored using a string-type variable or a set-type variable. However, the embodiments of the present disclosure are not limited to this, and the display field may be stored in other suitable forms.

According to the embodiments, the display field may be added to the audio or video data. When a video information is issued in response to an acquisition request of the user, in addition to the original audio or video data such as a video link, a cover link, etc., the display field may also be issued to the client used by the user. The display field may be used to display the text outline on the client, so that the video may be quickly located through the text outline.

In the embodiments of the present disclosure, the text outline and the time period associated with the text outline may be generated according to the text information extracted from the audio or video data, and the display field may be generated according to the text outline and the time period. The display field may provide the user with an overview of the audio or video, so as to help the user quickly locate the desired content and improve user experience.

Figure 3:
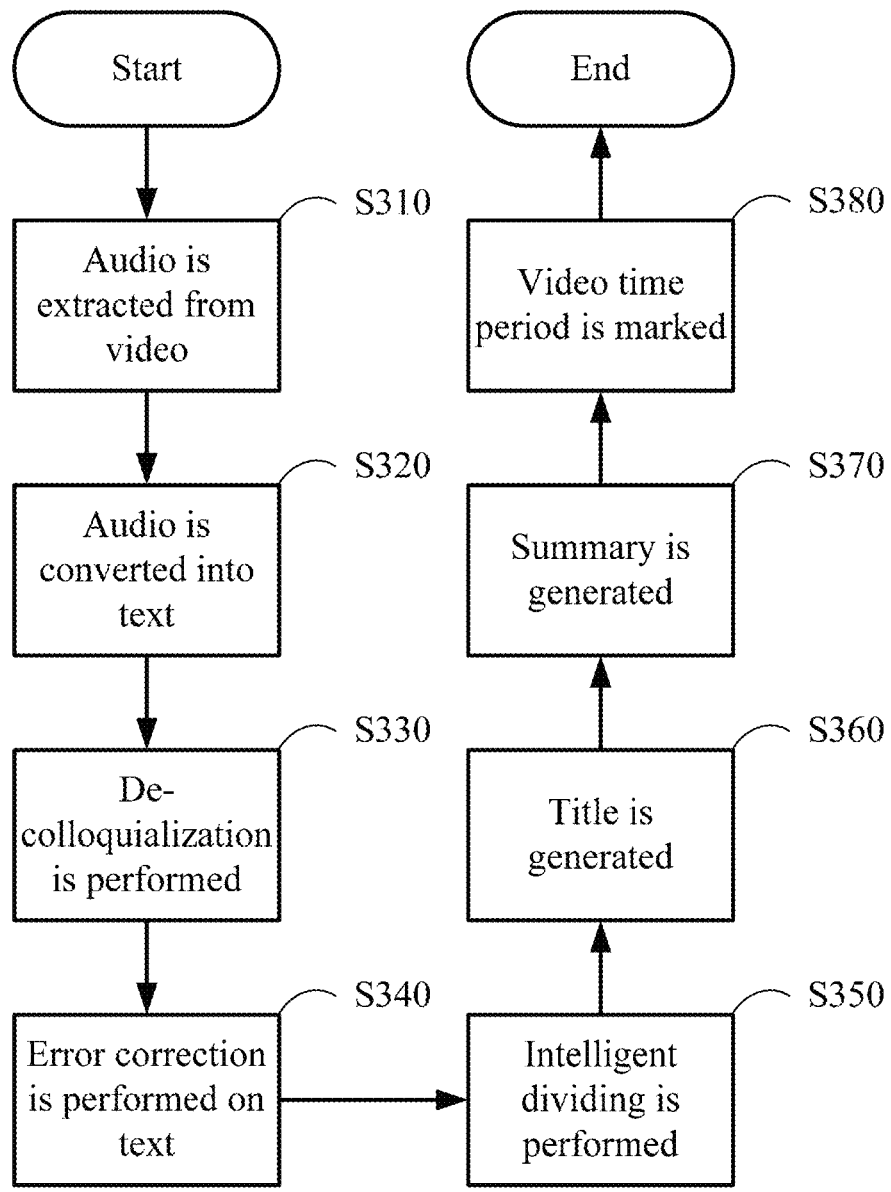
FIG. 3 shows a schematic diagram of a process of generating a text outline and a plurality of time periods according to some embodiments of the present disclosure.

FIG. 3 shows a schematic diagram of a process of generating the text outline and the plurality of time periods according to some embodiments of the present disclosure. As shown in FIG. 3, in step S310, audio data, such as original PCM data, is extracted from the video. In step S320, the audio data extracted is converted into a text, for example, by using a speech recognition module. Specific operations of step S310 and step S320 may refer to the embodiments described above, which will not be repeated here. Next, step S330 and step S340 may be performed to preprocess the text information obtained.

In step S330, a de-colloquialization is performed on the text information to remove an unimportant text content that may interfere with subsequent processing. In a specific embodiment, the de-colloquialization may be performed by using a trained deep learning model. For example, if "额这五千块钱呢够不够呢 (Uh, is five thousand yuan enough?)" is input into the deep learning model, the deep learning model may output a string "IOOOOOIOOOI", which indicates that a character in "额这五千块钱呢够不够呢" corresponding to a character "I" in "IOOOOOIOOOI" may be removed. That is, after the de-colloquialization is performed, the input "额这五千块钱呢够不够呢" is processed as "这五千块钱够不够 (is five thousand yuan enough?)". The above is only an example, and the present disclosure is not limited thereto.

In step S340, an error correction is performed on the text information (or the text information obtained after the de-colloquialization is performed) to find out a wrong text in the text that may cause ambiguity, so as to avoid affecting a processing result due to the ambiguity in subsequent processing. In a specific embodiment, the error correction may be performed by using a trained deep learning model. For example, if "XX 是一家人工只能公司 (XX is an artificial integrity company)" is input to the deep learning model, the deep learning model may correct the input to "XX 是一家人工智能公司 (XX is an artificial intelligence company)". The above is only an example, and the present disclosure is not limited thereto.

It should be noted that the deep learning model used in step S330 and step S340 may be any suitable deep learning model, which is not limited by the embodiments of the present disclosure.

Next, in step S350, step S360 and step S370, an intelligent dividing may be performed on the preprocessed text information, and a text paragraph title and a text paragraph summary may be generated.

Specifically, in step S350, the preprocessed text is divided. The text information generated from the original audio or video data is generally a paragraph of content. The intelligent dividing may be performed to divide logically close text content into an independent paragraph. In a specific embodiment, the dividing may be performed by using a trained deep learning model. In step S360, a text paragraph title is generated for the divided text. The text paragraph title is a highly centralized summary of the text paragraph, which may be generated by using a trained deep learning model. In step S370, a summary is generated for the divided text. The summary of the text paragraph may be considered as a core information of the text paragraph. In a specific embodiment, the summary may be generated by using an appropriate deep learning model. For example, the summary of the text paragraph may be obtained by inputting the text paragraph and the text title of the text paragraph into the model.

The following text is illustrated by way of example. "If you drink too much wine and cause nausea and vomiting, you may drink orange tea. Oranges may quickly alleviate a hangover and relieve human discomfort. Add 100 g of fresh orange peel to 500 ml of water to boil, and add a little salt and shake well. Drink it as tea to quickly alleviate a hangover. Consuming honey before drinking wine has a certain effect on preventing drunkenness. You may consume honey about an hour before drinking. After entering the human body, honey may reduce the absorption of alcohol by various organs of the human body, thereby preventing drunkenness. After getting drunk, you may dilute the honey with warm water, and then drink a few glasses of honey water. When entering the human body, honey may be quickly absorbed, increase the anti-alcohol function of the human body, and help the liver expel alcohol from the body as soon as possible, thus achieving the purpose of alleviating a hangover. Salt is very common in everyone's life. It is also a good hangover cure. Consuming salt after getting drunk may help reduce the alcohol concentration in the stomach, reduce the alcohol concentration in the blood, and help alleviate a hangover. You may take a cup of water, add a little salt and drink it directly. Yogurt is also a good hangover cure. If you drink too much, you may drink yogurt. Yogurt may protect gastric mucosa and delay the absorption of alcohol. Yogurt is rich in calcium and is especially effective in relieving irritability. Hovenia dulcis thunb, also known as longevity fruit in some areas, has a great effect in alleviating a hangover. Hovenia dulcis thunb contains a large amount of glucose and calcium malate, which has a strong diuretic effect. It may promote the decomposition and excretion of ethanol, significantly reduce the concentration of ethanol in the blood, eliminate the free radicals produced by ethanol in the body and prevent the formation of peroxyester, so as to reduce the damage of ethanol to liver tissue and avoid various metabolic abnormalities caused by alcoholism. Hovenia dulcis thunb may further digest excessive body fat and help lose weight. Pears may relieve internal heat or fever. Generally, 2 to 3 pears may help drunk people alleviate a hangover. Pear juice may also rapidly alleviate a hangover. After drinking wine, you may drink plenty of water to dilute the alcohol and speed up the metabolism, so as to rapidly expel the alcohol. Then you may drink two dextrose or make tea with honey. If you have a headache after drinking, you may eat some grapes." After the above text is input into the deep learning model used to generate the text title, a text title of "methods of alleviating a hangover" may be generated.

Further, after the text title generated and the text of the above text paragraph are input into the deep learning model used to generate a text summary, a following summary may be obtained. "Consuming honey before drinking wine has a certain effect on preventing drunkenness. You may consume honey about an hour before drinking. After entering the human body, honey may reduce the absorption of alcohol by various organs of the human body, thereby preventing drunkenness. Yogurt is rich in calcium and is especially effective in relieving irritability. Hovenia dulcis thunb, also known as longevity fruit in some areas, has a great effect in alleviating a hangover. Pears may relieve internal heat or fever. Generally, 2 to 3 pears may help drunk people alleviate a hangover. Pear juice may also rapidly alleviate a hangover."

In step S380, a video time period corresponding to the text information is marked. A process of generating the text outline and the time period based on the text information will be described in detail below.

According to the embodiments, the generating a text outline according to the text information may include: dividing the text information into a plurality of first text paragraphs, and generating a first text paragraph title for each first text paragraph of the plurality of first text paragraphs as a first level outline entry. Next, a text paragraph set is constructed based on the plurality of first text paragraphs, and the following operations are performed on each first text paragraph in the text paragraph set until each first text paragraph in the text paragraph set has a data amount less than a preset threshold: comparing the data amount of the first text paragraph with the preset threshold, and in response to the data amount of the first text paragraph being greater than or equal to the preset threshold: dividing the first text paragraph into a plurality of second text paragraphs, generating a second text paragraph title for each second text paragraph in the plurality of second text paragraphs, determining the second text paragraph title as a secondary outline entry of the first text paragraph title generated for the first text paragraph, and adding the plurality of second text paragraphs as first text paragraphs to the text paragraph set.

Figure 4:
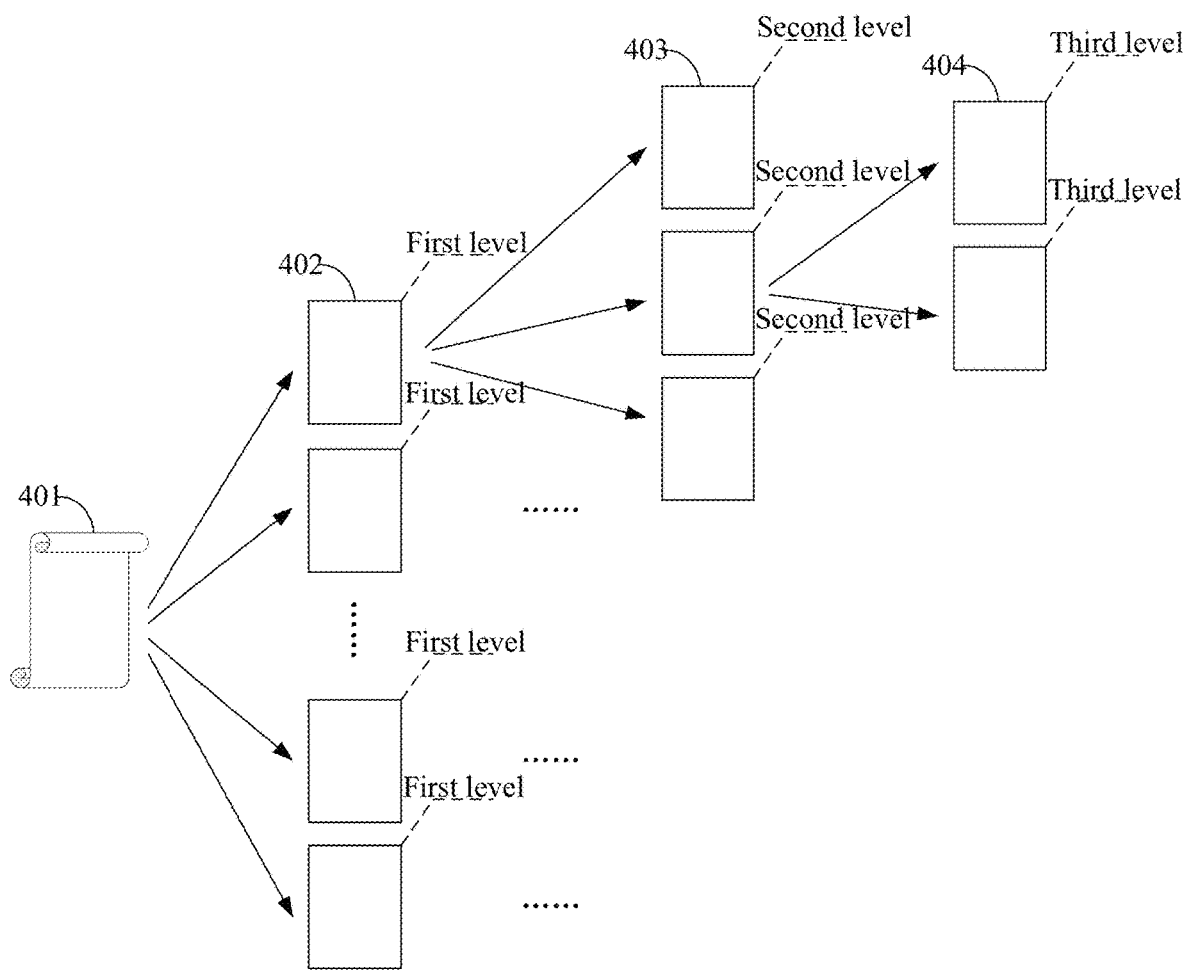
FIG. 4 shows an example of generating a text outline according to some embodiments of the present disclosure.

FIG. 4 shows an example of generating the text outline according to some embodiments of the present disclosure. As shown in FIG. 4, a text information 401 is firstly divided into a plurality of first text paragraphs 402, for example, by using the above-mentioned deep learning model used to perform the intelligent dividing on the text information. The first text paragraph title generated for the first text paragraph 402 may be used as the first level outline entry of the text outline. As shown in FIG. 4, a first level outline entry is generated for each first text paragraph, so that a plurality of first level outline entries are obtained. This process may be performed by using the above-mentioned deep learning model used to generate the text title for the text paragraph. Next, a first first text paragraph 402 is illustrated by way of example in describing the subsequent processing, and the "first first text paragraph 402" is referred to as the "first text paragraph 402" in the following description.

The data amount of the first text paragraph 402 is compared with the preset threshold of data amount. If the data amount of the first text paragraph 402 is greater than or equal to the preset threshold, a next level outline entry is further generated for the first text paragraph 402. Here, the preset threshold may be determined according to a depth or a granularity of the text outline. For example, the preset threshold may be set to 50% of a data amount of the original text information. The first text paragraph 402 and the corresponding first level outline entry may be input into the above-mentioned deep learning model used to generate the text paragraph summary (a first deep learning model), and the text paragraph summary of the first text paragraph 402 may be obtained. Then, the text paragraph summary generated may be input into the above-mentioned deep learning model used to perform the intelligent dividing (a second deep learning model), and the text paragraph summary is divided to obtain a plurality of second text paragraphs 403. As shown in FIG. 4, by dividing the first text paragraph 402, three second text paragraphs 403 may be obtained. A text paragraph title may be generated for each second text paragraph 403, and the text paragraph title may be used as a secondary level outline entry for the first text paragraph title, that is, a second level outline entry.

Next, the operation performed on the first text paragraph 402 as described above may be performed on each second text paragraph 403. The data amount of the second text paragraph 403 may be compared with the preset threshold. If the data amount of the second text paragraph 403 is greater than or equal to the preset threshold, a next level outline entry may be further generated for the second text paragraph 403. As shown in FIG. 4, through comparison, it may be determined that only a second second text paragraph 403 needs to be further segmented. Therefore, the summary generation and the intelligent dividing are performed only on the second second text paragraph 403, so as to obtain two second text paragraphs 404 (here, the second text paragraph 403 may be processed as a first text paragraph 402, so the text paragraph obtained is a second text paragraph). A text paragraph title is generated for the two second text paragraphs 404 as a secondary outline entry of the second text paragraph 403, that is, a third level outline entry. If the two second text paragraphs still include a second text paragraph that needs to be further divided, the processing described above may be further performed.

Figure 5:
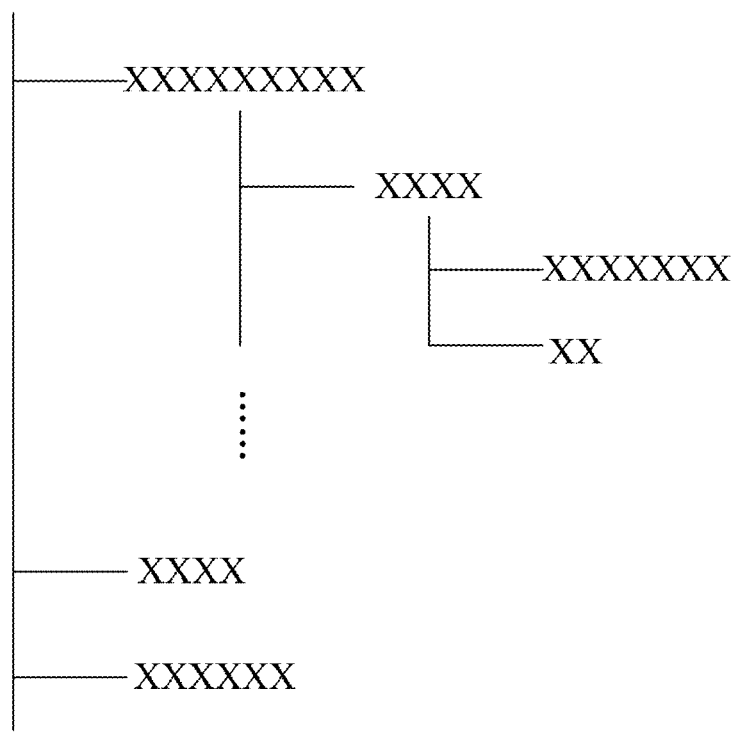
FIG. 5 shows a structural example of a text outline according to some embodiments of the present disclosure.

The above process is performed on one (first) first text paragraph 402. By repeatedly performing the above process on each first text paragraph 402, the multi-level outline entries included in the text outline may be obtained, which may have a structure shown in FIG. 5. As shown in FIG. 5, the outline entries may be shown as a tree structure. Different numbers of characters "X" represent different text titles, that is, outline entries at different levels. In FIG. 5, a title at a root node of the tree structure may be the title for the entire text, which may be obtained as an overall summary of the audio or video data, by using the above-described deep learning model used to generate the text paragraph title.

According to the embodiments of the present disclosure, the text outline for the text information is obtained by analyzing the text information layer by layer, and the logical structure of the text is shown through the text outline, which is conducive to the user's reference.

According to the embodiments, the generating a plurality of time periods according to the text information may include: marking a start time and an end time of each text statement contained in the text information according to the audio or video data, and determining the time period according to the start time and the end time of each text statement contained in the text information.

According to the embodiments, the determining the time period according to the start time and the end time of each text statement contained in the text information may include: in response to the first text paragraph title being generated for each first text paragraph of the plurality of first text paragraphs as the first level outline entry, determining a start time of a first text statement in the first text paragraph as a start time of a time period associated with the first level outline entry; and determine an end time of a last text statement in the first text paragraph as an end time of the time period associated with the first level outline entry.

According to the embodiments, the determining the time period according to the start time and the end time of each text statement contained in the text information may further include: in response to the second text paragraph title being generated for each second text paragraph of the plurality of second text paragraphs and the second text paragraph title being determined as the secondary level outline entry of the first text paragraph title generated for the first text paragraph, determining a start time of a first text statement in a second text paragraph as a start time of a time period associated with the secondary outline entry; and determine an end time of a last text statement in the second text paragraph as an end time of the time period associated with the secondary level outline entry.

Figure 6:
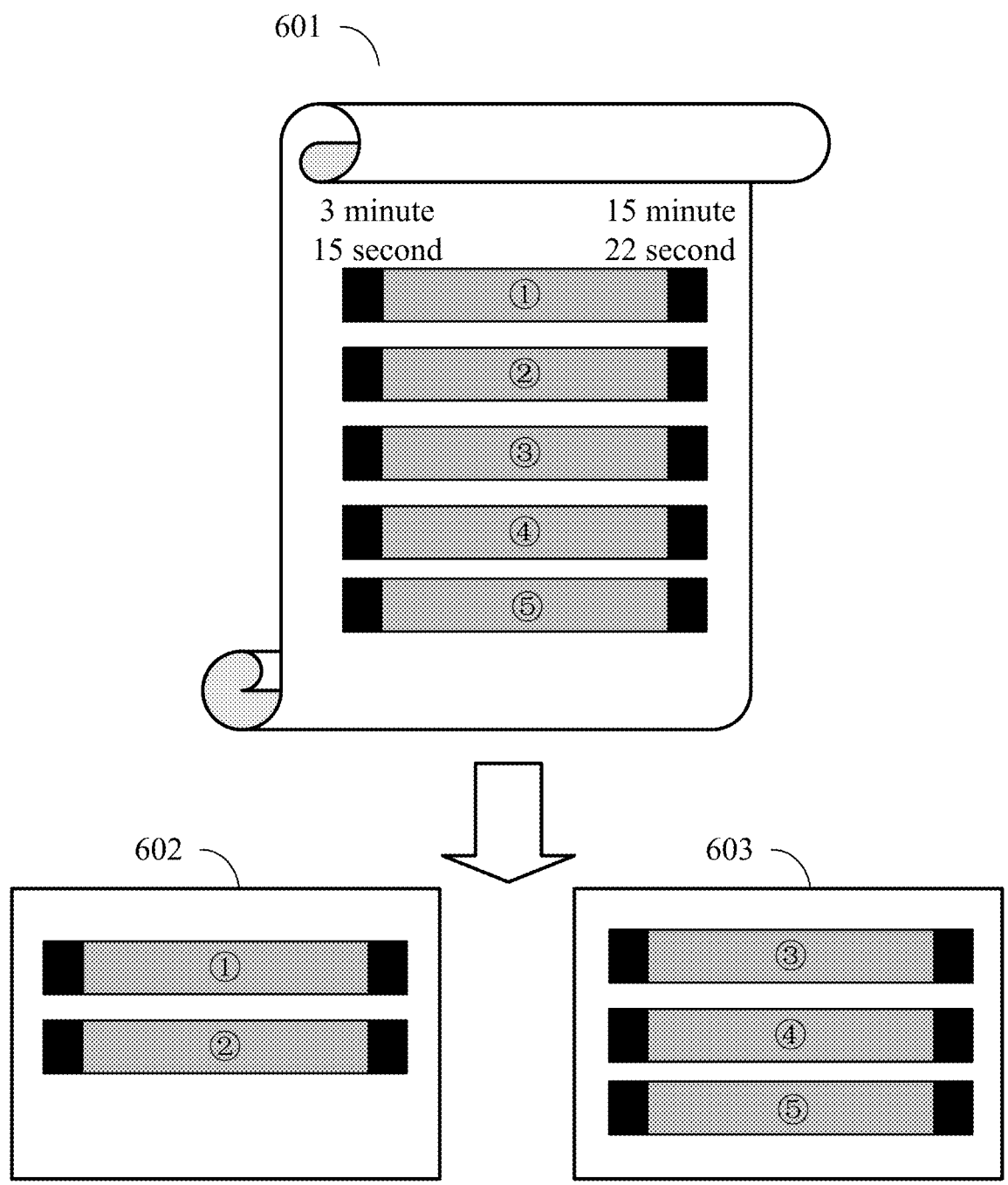
FIG. 6 shows an example of generating a time period according to some embodiments of the present disclosure.

FIG. 6 shows an example of generating the time period according to some embodiments of the present disclosure. As shown in FIG. 6, suppose that an original text information 601 contains five text statements. Start times and end times of the five text statements are marked respectively according to the time information in the audio or video data. FIG. 6 shows a start time and an end time of a first text statement. For example, the start time of the first text statement is at 3 minute 15 second, and the end time is at 15 minute 22 second. The start times and the end times of the other text statements may be similarly marked. It should be noted that the start time of the first text statement shown in FIG. 6 is not at 0 minute 0 second, because the relevant audio or video contains no sound (or text information) from 0 minute 0 second to 3 minute 15 second.

As shown in FIG. 6, two first text paragraphs 602 and 603 are obtained by dividing the original text information 601. The first text paragraph 602 may include text statements ①  and ② The first text paragraph 603 may include text statements ③, ④ and ⑤. When determining the time period of the first text paragraph 602, the start time of the text statement ① is determined as the start time of the time period, and the end time of the text statement ② is determined as the end time of the time period. When determining the time period of the first text paragraph 603, the start time of the text statement ③ is determined as the start time of the time period, and the end time of the text statement ⑤ is determined as the end time of the time period.

According to the embodiments, the first level outline entry corresponding to the first text paragraph 602 and the first level outline entry corresponding to the first text paragraph 603 may be associated with the above time periods, respectively, and an association relationship may be stored in the display field. The display field according to the embodiments of the present disclosure may provide the user with an overview of the audio or video, so as to help the user quickly locate the desired content and improve the user experience.

Figure 7:
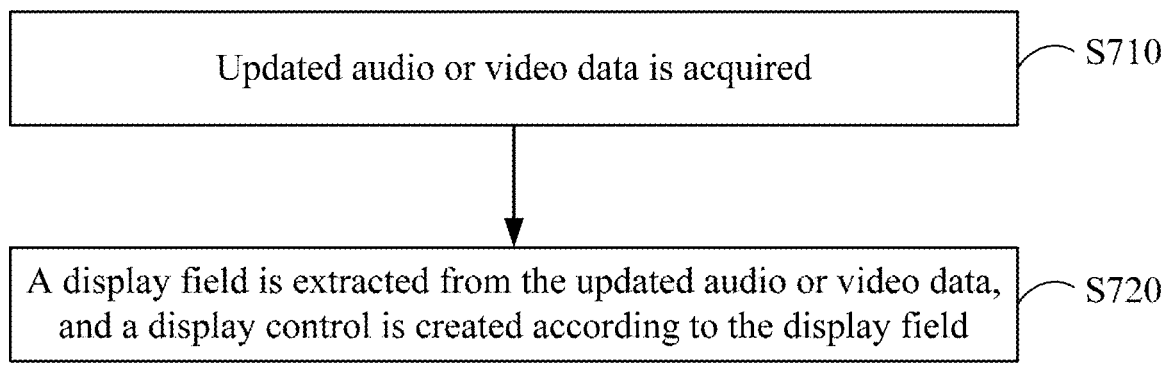
FIG. 7 shows a flowchart of a method of processing audio or video data according to another embodiment of the present disclosure.

FIG. 7 shows a flowchart of a method 700 of processing audio or video data according to another embodiment of the present disclosure. The method 700 of processing audio or video data may be applied to the terminal device, or may be provided by an application client installed on the terminal device. In addition, it may be understood that the method 700 of processing the audio or video data may also be applied to a server providing an audio or video data service, depending on a subject that requests the audio or video data in the server, which is not limited in the present disclosure. As shown in FIG. 7, the method 700 of processing the audio or video data includes following steps.

In step S710, updated audio or video data is acquired.

In step S720, a display field is extracted from the updated audio or video data, and a display control is created according to the display field.

According to the embodiments, the updated audio or video data acquired may be audio or video data that has been processed according to the method of processing audio or video data described above and that contains the display field.

According to the embodiments, the display control is created according to the display field, so that the text outline corresponding to the audio or video data may be displayed through the display control. The display control may include a floating layer control and a plurality of sub-controls. The creating a display control according to the display field may include: creating a floating layer control in response to the display field being not empty, parsing the display field to obtain multi-level outline entries, and adding the sub-controls to the floating layer control level by level according to the multi-level outline entries.

According to the embodiments, a click event may be further added for the display control. In response to clicking a sub-control, the click event may acquire the time period associated with the outline entry displayed by the sub-control, and call the player to decode the audio or video data within the time period, so as to play the audio or video data within the time period.

According to the embodiments, if the display field is in the form of a string, for example, if the display field contains "title (0, 120000) [first level outline entry (3000, 20000) [second level outline entry (8000, 15000)]] [first level outline entry (30000, 80000) [second level outline entry (30000, 70000) [third level outline entry (50000, 60000) third level outline entry (60000, 70000)]]] [first level outline entry (100000,120000)]", the display field may be parsed into a memory in a tree structure by a regular expression.

According to the embodiments, if the display field is in the form of a set, for example, if the display field contains

```
{content: //store the text content that actually needs to be displayed,
such as title, outline entry, etc.
 Id: //current specified tag
 ParentId: // ID of current parent node
 videoStart: //corresponding video start time
 videoEnd: //corresponding video end time
}
``` the set may be traversed directly and the display field may be parsed into the memory in a tree structure.

Figure 8:
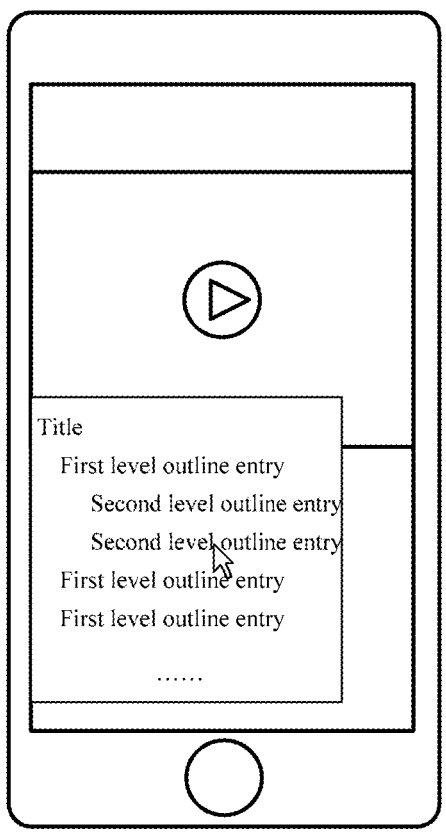
FIG. 8 shows a display example of a text outline according to some embodiments of the present disclosure.

FIG. 8 shows a display example of the text outline according to some embodiments of the present disclosure. As shown in FIG. 8, after the display field is issued to the client by the server, the client may parse the display field. In response to determining that the display field is not empty, a floating layer control may be added to display a text outline entrance button (as shown by the title in FIG. 8). The client may parse the display field issued by the server so as to obtain the text outline and the time period associated with the text outline. After the parsing, the sub-controls may be dynamically added layer by layer so as to display the outline entries for this layer of sub-controls. Next, the click event may be added to the sub-control by the client. When watching the video, the user may click a sub-control. After receiving the click event, the client may parse a data structure of a layer where the current sub-control is located, acquire the start time of the time period, then call an instance of the current player, and call a player seek method, with the acquired start time of the time period as a parameter. Then, the player may decode the video to the start time by using an internal decoder, re-render a picture, and display a video within the time period to the user.

With the method of processing the audio or video data according to the embodiments of the present disclosure, the user may overview the video through the displayed text outline without dragging the progress bar of the video, so as to quickly and accurately locate the desired video.

The embodiments of the present disclosure further provide an apparatus of processing audio or video data.

Figure 9:
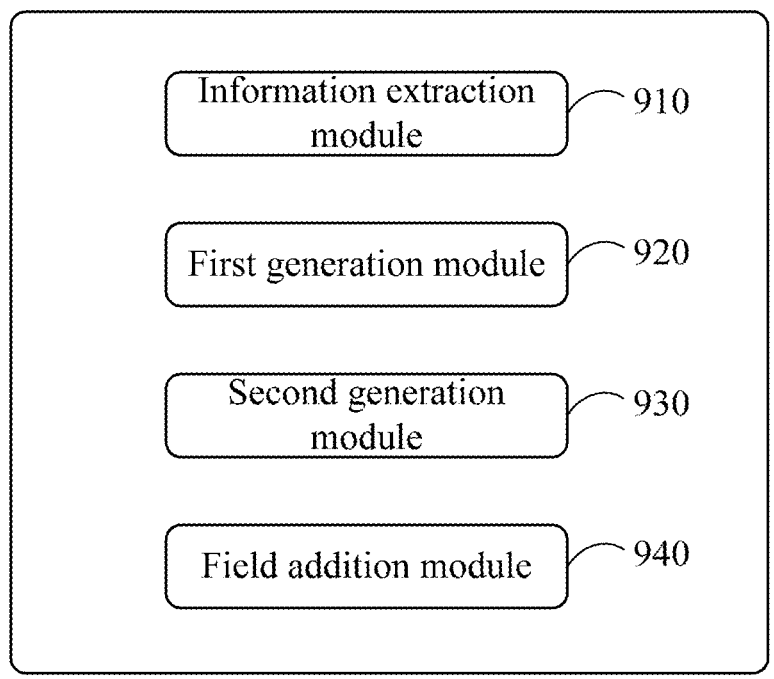
FIG. 9 shows a block diagram of an apparatus of processing audio or video data according to some embodiments of the present disclosure.

FIG. 9 shows a block diagram of an apparatus 900 of processing audio or video data according to some embodiments of the present disclosure. As shown in FIG. 9, the apparatus 900 of processing audio or video data includes an information extraction module 910, a first generation module 920, a second generation module 930, and a field addition module 940.

According to the embodiments, the information extraction module 910 is used to extract a text information from the audio or video data. The first generation module 920 is used to generate a text outline and a plurality of time periods according to the text information. The text outline may include multi-level outline entries, and the plurality of time periods are associated with the multi-level outline entries. The second generation module 930 is used to generate a display field for the audio or video data according to the text outline and the plurality of time periods. The field addition module 940 is used to add the display field to the audio or video data so as to obtain updated audio or video data.

Specific operations of the above functional modules may be acquired by referring to the operation steps of the method 200 of processing the audio or video data in the embodiments described above, which will not be repeated here.

Figure 10:
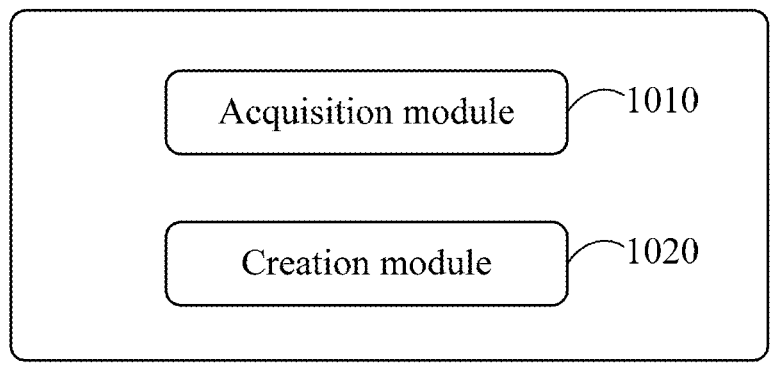
FIG. 10 shows a block diagram of an apparatus of processing audio or video data according to another embodiment of the present disclosure.

FIG. 10 shows a block diagram of an apparatus 1000 of processing audio or video data according to some embodiments of the present disclosure. As shown in FIG. 10, the apparatus 1000 of processing the audio or video data includes an acquisition module 1010 and a creation module 1020.

According to the embodiments, the acquisition module 1010 is used to acquire updated audio or video data. The updated audio or video data may be audio or video data that has been processed according to the method of processing audio or video data described above and that contains the display field. The creation module 1020 is used to extract a display field from the updated audio or video data, and create a display control according to the display field.

In the technical solution of the present disclosure, the collection, storage, use, processing, transmission, provision, and disclosure of the user's personal information involved are in compliance with relevant laws and regulations, and do not violate public order and good customs.

Specific operations of the above functional modules may be acquired by referring to the operation steps of the method 700 of processing audio or video data in the embodiments described above, which will not be repeated here.

Figure 11:
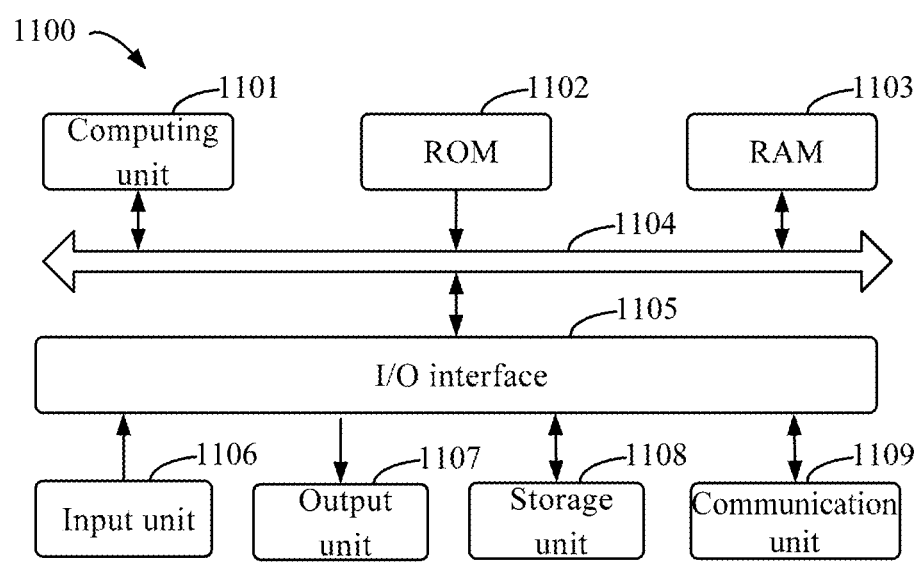
FIG. 11 shows a block diagram of an electronic device for implementing the method of processing audio or video data of the embodiments of the present disclosure.

FIG. 11 shows a schematic block diagram of an exemplary electronic device 1100 for implementing the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 11, the electronic device 1100 includes a computing unit 1101, which may perform various appropriate actions and processing based on a computer program stored in a read-only memory (ROM) 1102 or a computer program loaded from a storage unit 1108 into a random access memory (RAM) 1103. Various programs and data required for the operation of the electronic device 1100 may be stored in the RAM 1103. The computing unit 1101, the ROM 1102 and the RAM 1103 are connected to each other through a bus 1104. An input/output (I/O) interface 1105 is also connected to the bus 604.

Various components in the electronic device 1100, including an input unit 1106 such as a keyboard, a mouse, etc., an output unit 1107 such as various types of displays, speakers, etc., a storage unit 1108 such as a magnetic disk, an optical disk, etc., and a communication unit 1109 such as a network card, a modem, a wireless communication transceiver, etc., are connected to the I/O interface 1105. The communication unit 1109 allows the electronic device 1100 to exchange information/data with other devices through a computer network such as the Internet and/or various telecommunication networks.

The computing unit 1101 may be various general-purpose and/or special-purpose processing components with processing and computing capabilities. Some examples of the computing unit 1101 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 1101 may perform the various methods and processes described above, such as the method of processing the audio or video data. For example, in some embodiments, the method of processing the audio or video data may be implemented as a computer software program that is tangibly contained on a machine-readable medium, such as the storage unit 1108. In some embodiments, part or all of a computer program may be loaded and/or installed on electronic device 1100 via the ROM 1102 and/or the communication unit 1109. When the computer program is loaded into the RAM 1103 and executed by the computing unit 1101, one or more steps of the method of processing the audio or video data described above may be performed. Alternatively, in other embodiments, the computing unit 1101 may be configured to perform the method of processing the audio or video data in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a distributed system server, or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of processing audio or video data, comprising:

extracting a text information from the audio or video data;

generating a text outline and a plurality of time periods according to the text information, wherein the text outline comprises multi-level outline entries used as titles for text paragraphs, and the plurality of time periods are associated with the multi-level outline entries;

generating a display field for the audio or video data according to the text outline and the plurality of time periods, wherein the display field stores an association relationship between the outline entries in the text outline and the plurality of time periods; and adding the display field to the audio or video data, so as to obtain updated audio or video data, wherein the generating a text outline and a plurality of time periods according to the text information comprises:

dividing the text information into a plurality of first text paragraphs;

generating a first text paragraph title for each first text paragraph of the plurality of first text paragraphs as a first level outline entry;

constructing a text paragraph set based on the plurality of first text paragraphs;

processing the each first text paragraph in the text paragraph set, and in response to a data amount of the each first text paragraph being greater than or equal to a preset threshold, dividing the each first text paragraph into a plurality of second text paragraphs; and generating an outline entry in a next level for each second text paragraph of the plurality of second text paragraphs, until the each first text paragraph and the each second text paragraph in the text paragraph set has a data amount less than the preset threshold, wherein the preset threshold is determined according to a depth or a granularity of the text outline.

2. The method of claim 1, wherein the processing the each first text paragraph in the text paragraph set, and in response to a data amount of the each first text paragraph being greater than or equal to a preset threshold, dividing the each first text paragraph into a plurality of second text paragraphs comprises:

comparing the data amount of the each first text paragraph with the preset threshold; and in response to the data amount of the each first text paragraph being greater than or equal to the preset threshold:

dividing the each first text paragraph into the plurality of second text paragraphs;

wherein the generating an outline entry in a next level for each second text paragraph of the plurality of second text paragraphs, until the each first text paragraph and the each second text paragraph in the text paragraph set has a data amount less than the preset threshold comprises:
  generating a second text paragraph title for each second text paragraph in the plurality of second text paragraphs, and determining the second text paragraph title as a secondary level outline entry of the first text paragraph title generated for the each first text paragraph; and
  adding the plurality of second text paragraphs as first text paragraphs to the text paragraph set.

3. The method of claim 2, wherein the dividing the each first text paragraph into a plurality of second text paragraphs comprises:
  extracting a summary of the each first text paragraph by using a first deep learning model, so as to obtain a text paragraph summary; and
  dividing the text paragraph summary by using a second deep learning model, so as to obtain the plurality of second text paragraphs.

4. The method of claim 2, wherein the generating a text outline and a plurality of time periods according to the text information further comprises:
  marking a start time and an end time of each text statement contained in the text information according to the audio or video data; and
  determining the time period according to the start time and the end time of the each text statement contained in the text information.

5. The method of claim 4, wherein the determining the time period according to the start time and the end time of the each text statement contained in the text information comprises: in response to the first text paragraph title being generated for the each first text paragraph of the plurality of first text paragraphs as the first level outline entry,
  determining a start time of a first text statement in the each first text paragraph as a start time of a time period associated with the first level outline entry; and
  determining an end time of a last text statement in the each first text paragraph as an end time of the time period associated with the first level outline entry.

6. The method of claim 5, wherein the determining the time period according to the start time and the end time of the each text statement contained in the text information further comprises: in response to the second text paragraph title being generated for the each second text paragraph of the plurality of second text paragraphs and the second text paragraph title being determined as the secondary level outline entry of the first text paragraph title generated for the each first text paragraph,
  determining a start time of a first text statement in the each second text paragraph as a start time of a time period associated with the secondary level outline entry; and
  determining an end time of a last text statement in the each second text paragraph as an end time of the time period associated with the secondary level outline entry.

7. The method of claim 5, wherein the generating a display field for the audio or video data according to the text outline and the plurality of time periods comprises:
  combining each outline entry of the plurality of outline entries in the text outline and an associated time period in the plurality of time periods into a data pair; and
  storing the data pair in a string-type variable or a set-type variable as the display field, according to a hierarchical relationship between the multi-level outline entries.

8. The method of claim 6, wherein the generating a display field for the audio or video data according to the text outline and the plurality of time periods comprises:
  combining each outline entry of the plurality of outline entries in the text outline and an associated time period in the plurality of time periods into a data pair; and
  storing the data pair in a string-type variable or a set-type variable as the display field, according to a hierarchical relationship between the multi-level outline entries.

9. A method of processing audio or video data, comprising:
  acquiring updated audio or video data; and
  extracting a display field from the updated audio or video data, and creating a display control according to the display field,
  wherein the updated audio or video data is generated according to operations of processing audio or video data, comprising:
    extracting a text information from the audio or video data;
    generating a text outline and a plurality of time periods according to the text information, wherein the text outline comprises multi-level outline entries used as titles for text paragraphs, and the plurality of time periods are associated with the multi-level outline entries;
    generating a display field for the audio or video data according to the text outline and the plurality of time periods, wherein the display field stores an association relationship between the outline entries in the text outline and the plurality of time periods; and
    adding the display field to the audio or video data, so as to obtain updated audio or video data,
  wherein the generating a text outline and a plurality of time periods according to the text information comprises:
    dividing the text information into a plurality of first text paragraphs;
    generating a first text paragraph title for each first text paragraph of the plurality of first text paragraphs as a first level outline entry;
    constructing a text paragraph set based on the plurality of first text paragraphs;
    processing the each first text paragraph in the text paragraph set, and in response to a data amount of the each first text paragraph being greater than or equal to a preset threshold, dividing the each first text paragraph into a plurality of second text paragraphs; and
    generating an outline entry in a next level for each second text paragraph of the plurality of second text paragraphs, until the each first text paragraph and the each second text paragraph in the text paragraph set has a data amount less than the preset threshold, wherein the preset threshold is determined according to a depth or a granularity of the text outline.

10. The method of claim 9, wherein the display control comprises a floating layer control and a plurality of sub-controls, and the creating a display control according to the display field comprises:
  creating the floating layer control in response to the display field being not empty;
  parsing the display field so as to obtain multi-level outline entries; and
  adding the sub-controls level by level to the floating layer control according to the multi-level outline entries.

11. The method of claim 10, further comprising:
adding a click event for the display control, wherein the click event is configured to, in response to clicking a sub-control, acquire a time period associated with an outline entry displayed by the sub-control, and call a player to decode the audio or video data within the time period, so as to play the audio or video data within the time period.

12. The method of claim 9, wherein the processing the each first text paragraph in the text paragraph set, and in response to a data amount of the each first text paragraph being greater than or equal to a preset threshold, dividing the each first text paragraph into a plurality of second text paragraphs comprises:
comparing the data amount of the each first text paragraph with the preset threshold; and
in response to the data amount of the each first text paragraph being greater than or equal to the preset threshold:
dividing the each first text paragraph into the plurality of second text paragraphs;
wherein the generating an outline entry in a next level for each second text paragraph of the plurality of second text paragraphs, until the each first text paragraph and the each second text paragraph in the text paragraph set has a data amount less than the preset threshold comprises:
generating a second text paragraph title for each second text paragraph in the plurality of second text paragraphs, and determining the second text paragraph title as a secondary level outline entry of the first text paragraph title generated for the each first text paragraph; and
adding the plurality of second text paragraphs as first text paragraphs to the text paragraph set.

13. The method of claim 12, wherein the dividing the each first text paragraph into a plurality of second text paragraphs comprises:
extracting a summary of the each first text paragraph by using a first deep learning model, so as to obtain a text paragraph summary; and
dividing the text paragraph summary by using a second deep learning model, so as to obtain the plurality of second text paragraphs.

14. The method of claim 12, wherein the generating a text outline and a plurality of time periods according to the text information further comprises:
marking a start time and an end time of each text statement contained in the text information according to the audio or video data; and
determining the time period according to the start time and the end time of the each text statement contained in the text information.

15. The method of claim 14, wherein the determining the time period according to the start time and the end time of the each text statement contained in the text information comprises: in response to the first text paragraph title being generated for the each first text paragraph of the plurality of first text paragraphs as the first level outline entry,
determining a start time of a first text statement in the each first text paragraph as a start time of a time period associated with the first level outline entry; and
determining an end time of a last text statement in the each first text paragraph as an end time of the time period associated with the first level outline entry.

16. The method of claim 15, wherein the determining the time period according to the start time and the end time of the each text statement contained in the text information further comprises: in response to the second text paragraph title being generated for the each second text paragraph of the plurality of second text paragraphs and the second text paragraph title being determined as the secondary level outline entry of the first text paragraph title generated for the each first text paragraph,
determining a start time of a first text statement in the each second text paragraph as a start time of a time period associated with the secondary level outline entry; and
determining an end time of a last text statement in the each second text paragraph as an end time of the time period associated with the secondary level outline entry.

17. An electronic device, comprising:
at least one processor; and
a memory communicatively connected to the at least one processor, wherein the memory stores instructions executable by the at least one processor, and the instructions, when executed by the at least one processor, cause the at least one processor to implement the method of claim 1.

18. An electronic device, comprising:
at least one processor; and
a memory communicatively connected to the at least one processor, wherein the memory stores instructions executable by the at least one processor, and the instructions, when executed by the at least one processor, cause the at least one processor to implement the method of claim 9.

19. A non-transitory computer-readable storage medium having computer instructions stored thereon, wherein the computer instructions allow a computer to implement the method of claim 1.

20. A non-transitory computer-readable storage medium having computer instructions stored thereon, wherein the computer instructions allow a computer to implement the method of claim 9.

* * * * *